Feb. 3, 1970  A. STEVENS  3,492,827
GROUTING NOZZLE
Filed Sept. 30, 1968  2 Sheets-Sheet 1
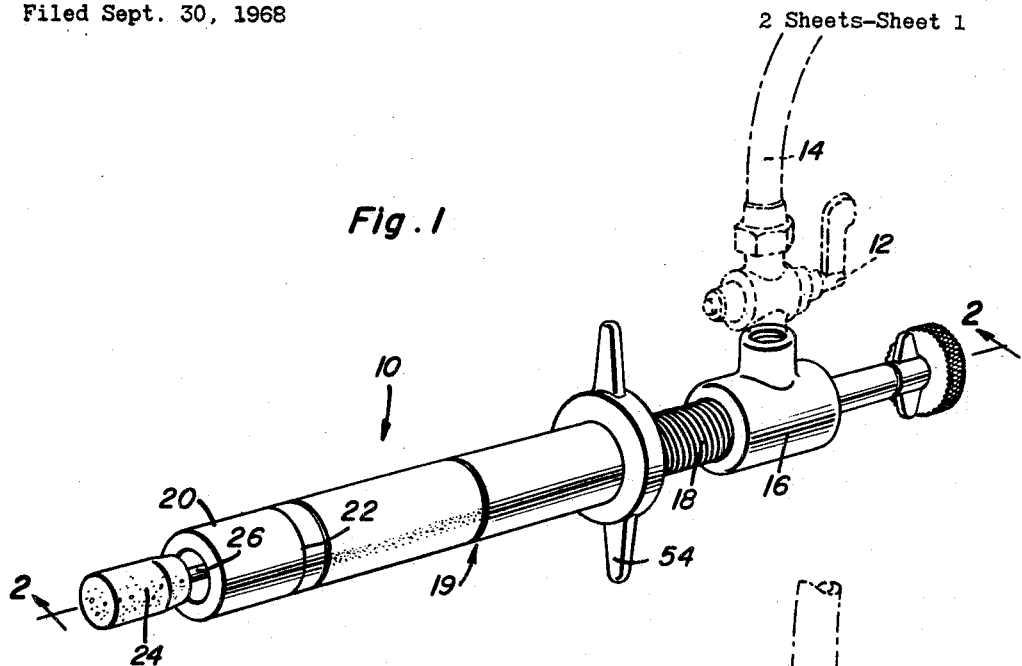
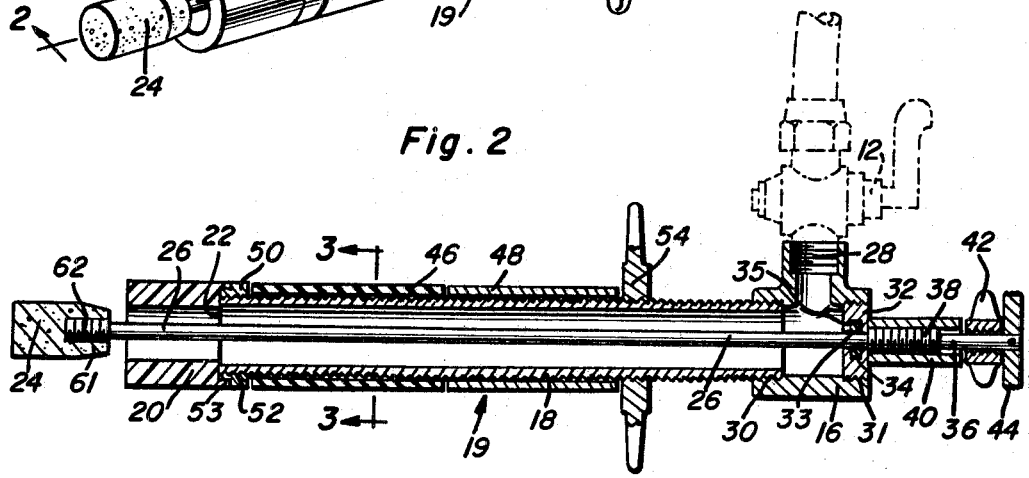
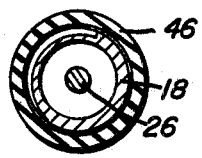
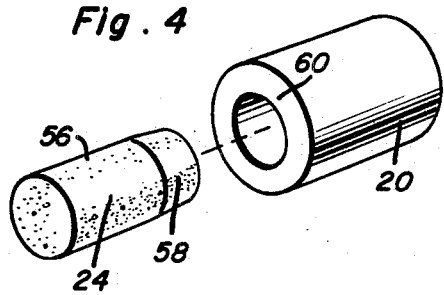
Antoni Stevens
INVENTOR.

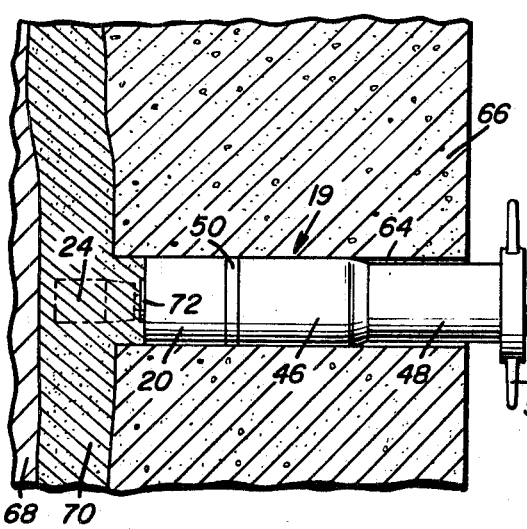
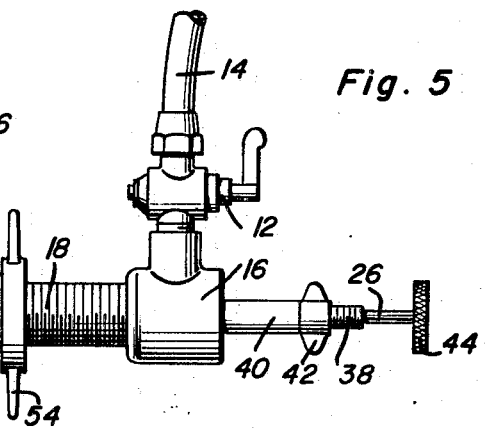
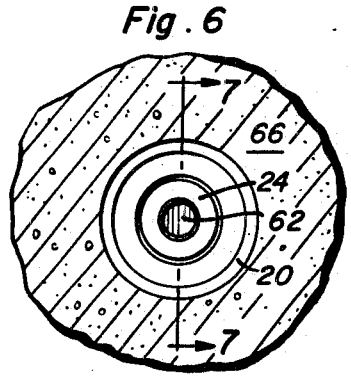
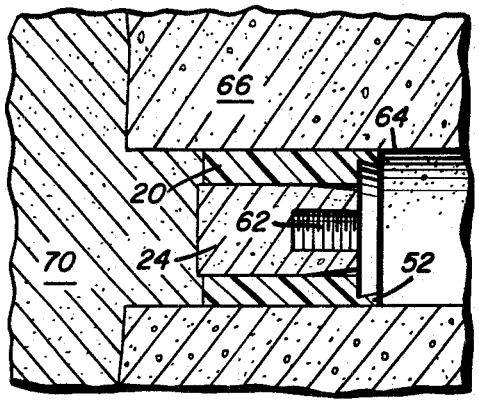
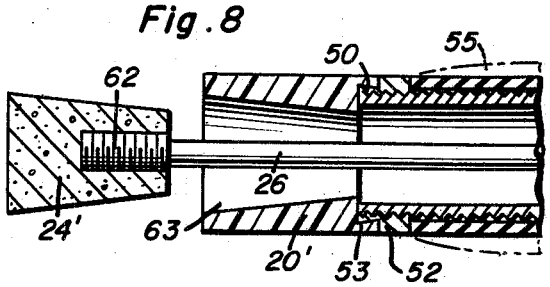
Antoni Stevens
INVENTOR.

United States Patent Office 3,492,827
Patented Feb. 3, 1970

3,492,827
GROUTING NOZZLE
Antoni Stevens, 578 Sherman Ave.,
Roselle, N.J. 07203
Filed Sept. 30, 1968, Ser. No. 763,591
Int. Cl. E02b 1/00; E04g 21/02
U.S. Cl. 61—63                                   7 Claims

ABSTRACT OF THE DISCLOSURE

A pipe nozzle including an actuator rod centrally disposed therein. A hollow sleeve membed is releasably secured to the outward end of the nozzle and is adapted for sealing engagement with a bore. A plug member is releasably connected to the outward end of the displaceable actuator rod and may be caused to seat within the hollow sleeve member thereby blocking the bore. Enagagement of the plug member and the hollow sleeve causes release of the hollow sleeve from the nozzle end thus permitting withdrawal of the nozzle from the bore.

---

This invention relates to filling nozzles and more particularly to grouting nozzles.

In the construction of a tunnel, the void developed between a bored rock bed and a confronting surface of the tunnel structure must be filled. In the past, filling nozzles have been inserted within specially bored holes located along the length of the tunnel structure. Grouting material is forced to flow through the nozzle, under pressure, until the void is filled. The nozzle is generally retained within the bore until the grouting material sets sufficiently. However, if the material sets too extensively, withdrawal of the nozzle is made difficult and prying generally results in the destruction of the nozzzle. Certain prior art devices have included ball valve attachments to grouting nozzle assemblies. However, such attachments are prone to failure because foreign matter introduced by the grouting material has a tendency to inhibit proper valve closure at the termination of a grouting operation.

The present invention includes a grouting nozzle which mounts a two-part bore seal. Both parts are retained in spaced relation from one another during a grouting operation thereby permitting free flow of grouting material therethrough. A first sealing member prevents backflow through a bore during the grouting operation. The second member serves as a plug for sealing passage through the first-mentioned member and causes occlusion of the bore. Means are provided for separating the two-part sealing assembly from the nozzle thereby permitting the use of the nozzle in subsequent operations. The present invention offers the advantage of quickly sealing a bore after a grouting operation with an inexpensive and easily constructed sealing assembly. Withdrawal of the nozzle from the bore is easily accomplished in a minimum amount of time thereby decreasing the number of man hours necessary for grouting an entire length of a tunnel, through a series of spaced bores.

Although the preceding description was directed toward the utilization of the present invention for grouting a tunnel construction, it is to be emphasized that the present invention may be utilized to plug bores in a simple and efficient manner. Further, the present invention may be employed for injecting grouting materials into a hole drilled in concrete, rock, or similar wall structures in order to fill any fissures, cracks or the like which are present within the interior of such structure or between adjacently positioned structures.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the present grouting nozzle assembly.

FIG. 2 is a longitudinal sectional view of the invention shown in FIG. 1 and taken along a plane passing along section line 2—2 of FIG. 1.

FIG. 3 is a transverse sectional view taken along a plane passing through section line 3—3 of FIG. 2.

FIG. 4 is a perspective view illustrating the relationship between two members of a bore sealing assembly.

FIG. 5 is an elevational view illustrating the disposition of the present invention within a poured concrete structure.

FIG. 6 is an end elevational view illustrating the appearance of a plugged bore.

FIG. 7 is a longitudinal sectional view taken along a plane passing through section line 7—7 of FIG. 6.

FIG. 8 is a partial longitudinal sectional view illustrating the relationship between a second embodiment of the two-part sealing assembly.

FIG 9 is a perspective view of a second form of the plug member shown in FIG. 8.

Referring specifically to the drawings and more particularly FIG. 1, the grouting nozzle which forms the present invention is generally denoted by 10 which is adapted for attachment to a valve member 12 of conventional design which permits flow control of grouting material through a supply line 14 to the grouting nozzle. A T-connector 16 receives the outlet of valve 12. In addition, the connector 16 threadingly engages an elongated pipe section 18 which directs the flow of grouting material therealong. A jacket assembly generally denoted by 19 concentrically covers the pipe section 18 and serves to prevent backflow through a bore when the grouting nozzle is inserted therein during a grouting operation, as explained hereinafter. The outward end 22 of jacket 19 and pipe section 18 are transversely aligned and the outward end of the jacket portion 19 mounts a sleve member 20 made of plastic, nylon, or the like, which peripherally engages the interior wall of a bore and further serves as a receptacle for a grouting plug member 24, preferably made of concrete, which is mounted in axially spaced relation to the grouting nozzle 10 by means of an actuator rod 26, the latter being axially disposed within pipe section 18. During a grouting operation, the plug member 24 is displaced from sleeve member 20 and at the termination of the grouting operation, the actuator is displaced so that plug 24 engages the hollow sleeve member 20 thereby sealing the bore. The grouting nozzle may then be withdrawn from the bore thereby leaving plug member 24 and sleeve member 20 in bore occluding engagement.

Considering the structure of the present invention in greater detail, reference is made to FIG. 2 which illustrates the entry components of the present grouting nozzle. The T-connector 16 includes a first threaded inlet 28 for accommodating a complementing fitting of valve 12. A second port 30 disposed perpendicularly to the threaded inlet port 28 threadingly receives an end of pipe section 18. A third threaded port 31 in T-connector 16 is oppositely disposed from the second port 30 and includes a sealing disk 32 therein. This disk has a centrally formed aperture therein to permit the passage of rod actuator 36 therethrough. A packing gland 34 is axially mounted upon rod 26 and retained in place by a recess 35 formed centrally within disk member 32. Thus, the T-connector 16 is adapted to permit the flow of grouting material only through outlet port 30, the port 32 being sealed. The end portion of rod 26 extending outwardly from T-connector 16 is indicated by 36 and is seen to include a threaded portion 38 along the length thereof which is normally housed within a cylindrical sleeve member 40. An interiorly threaded wing nut 42 is axially disposed on actuating rod 26 and in outward spaced relation to sleeve member 40. The outermost end portion of actuating rod 26 mounts a knurled knob 44 thereon thereby permitting manual manipulation of the actuating rod 26. Thus, at the termination of a grouting operation, it is necessary for plug member 24 to be concentrically engaged with sleeve member 20 which in turn requires the outward pulling of actuator rod 26 until engagement between the plug and sleeve members is completed. This action is achieved by pulling outwardly on knurled knob 44 until the threaded portion 38 engages the complementing threads in the wing nut fastener 42. When such engagement occurs, the wing nut is turned in a manner axially displacing actuator rod 26 and causing intimate engagement between plug member 24 and sleeve member 20. A cylindrical elastomeric sleeve member 46 is disposed along the length of pipe section 18. A second sleeve member 48 fabricated from a suitable metal material is likewise positioned upon pipe section 18 in adjacent relation to the elastomeric sleeve member 46. An annular ring member 50 is disposed along the outward end portion of pipe section 18 in confronting relation with the free end of elastomeric sleeve member 46. This ring includes an annular wedged recess 52 for accommodating the complementary shaped end portion of sleeve member 20. The purpose of the recess is to releasably mount sleeve member 20 for purposes to become apparent hereinafter. An annular collar 54 is positioned in concentric relation to pipe section 18, adjacent the free end of sleeve member 48. Thus, when the grouting nozzle 10 is inserted within a bore, annular collar 54 is positioned to extend outwardly from the bore to permit the manual turning thereof which in turn causes displacement of the metal sleeve member 48 which causes compression of elastomeric sleeve member 46 between the metallic sleeve 48 and the ring member 50. This compression results in the radially outward expansion of the elastomeric sleeve 46 which causes the sealing engagement between elastomeric sleeve member 46 and the interior wall of a bore thereby preventing the leakage of grouting material therethrough. The expansion of the elastomeric sleeve 46 is indicated by reference numeral 55 in FIG. 8, and the relation between the sleeve members and a bore is clearly shown in FIG. 5.

The particular construction of plug member 24 and sleeve member 20 is shown in FIG. 4 of the drawings. Plug member 24 includes a right cylindrical portion 56 and a second tapered portion 58 appending axially therefrom. The sleeve member 20 includes an axial bore 60 which permits a press-fit between sleeve member 20 and the right cylindrical portion 56 of plug member 24.

Modifications of the plug and mating sleeve members are shown in FIG. 8. It will be noticed in this figure that the plug member is represented by a frusto-conical plug 24', preferably made of concrete, having an axially threaded bore 62 extending from the narrowed end of the plug. This threaded bore 62 is likewise formed within the first-mentioned plug 24 as seen in FIG. 7. The outward end of rod 26 includes a threaded element 61 which threadably engages bore 62 thereby mounting the plug. In the case of the frusto-conical plug member 24', FIG. 8 illustrates a complementing tapered bore in sleeve member 20', as indicated by 63.

In operation of the device, the jacket portion 19 is inserted within a bore 64 as shown in FIG. 5. In the case of tunnel construction, the bore is formed through the tunnel wall 66. The purpose of the grouting operation is to fill the void 70 between the inner surface of the concrete wall and an adjacently situated rock bed 68. The first step in the grouting operation requires the turning of collar 54 which causes the expansion of the elastomeric sleeve 46 until sealing engagement with bore 64 is effected. The actuator rod 26 is depressed inwardly so that plug member 24 is displaced in spaced relation with respect to the interior end of the grouting nozzle as shown in phantom. Next, valve 12 is opened to permit the flow of grouting material through line 14 to pipe section 18. The grouting material fills the void 70 after being deposited therein through the outlet end of pipe section 18.

The next step in the operation requires the retraction of plug member 24 within the nozzle as indicated by 72. It will be noted in FIG. 5 that actuator rod 26 is displaced outwardly and retained in a displaced position by threadingly engaging wing nut fastener 42 and threaded portion 38. Entry of plug member 24 into sleeve member 20 forces dislocation between the annular wedge-shaped end portion 53 of sleeve member 20 and the complementing annular wedge-shaped end portion 52 of ring 50. Thus, at this point, plug member 24 is intimately engaged within sleeve member 20, the latter being separated from the grouting nozzle. The combination of the plug and mating sleeve members effects total occlusion of bore 64.

The final step involves the withdrawal of the grouting nozzle from bore 64 which requires the unscrewing of collar 54 returning elastomeric sleeve 46 to its previous non-sealing position. The threaded end portion of rod actuator 26 is disengaged from the threaded bore 62 in plug member 24 by means of rotating the knurled knob 44. This permits the easy withdrawal of the entire grouting nozzle from bore 64. The final result is shown in FIG. 7 wherein plug member 24 and sleeve member 20 are intimately engaged to form a seal or block along an intermediate length of bore 64 thereby preventing backflow of grouting material through the bore.

In due course, the grouting material hardens, thereby completing the grouting operation. It is noted that unlike several prior art approaches, in the present invention, the grouting nozzle may be immediately withdrawn from the bore after sealing engagement between plug member 24 and sleeve member 20 is effected. Thus, it is unnecessary to wait until the grouting material has set to any extent. This permits the disassembly of the grouting nozzle while the grouting material residue contained therein is still fresh. Thus, the washing and cleaning of the nozzle parts is a simple matter. No chipping of hardened grouting material is necessary.

In the event that the inserted sealing assembly including plug member 24 and sleeve member 20 must be removed for subsequent grouting, the assembly is merely drilled out and subsequently replaced in the same manner as described hereinbefore.

Although the present invention has been described in terms of its utilization as a filling or grouting nozzle, it will be noted that the present invention may be effectively employed in the sealing of a bore, without the necessity of guiding the flow of material therethrough. Thus, the present invention has wide application in the construction arts. Further, the present nozzle may be used with materials other than grouting material.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A device for sealing a bore comprising an elongated casing, a hollow sleeve member releasably secured to said casing and insertable within a bore for peripheral sealing engagement with the bore, actuator means connected to said casing, a plug member connected to an outward end of said actuator means in normally spaced relation to said casing, said plug member being slidable in response